UNITED STATES PATENT OFFICE.

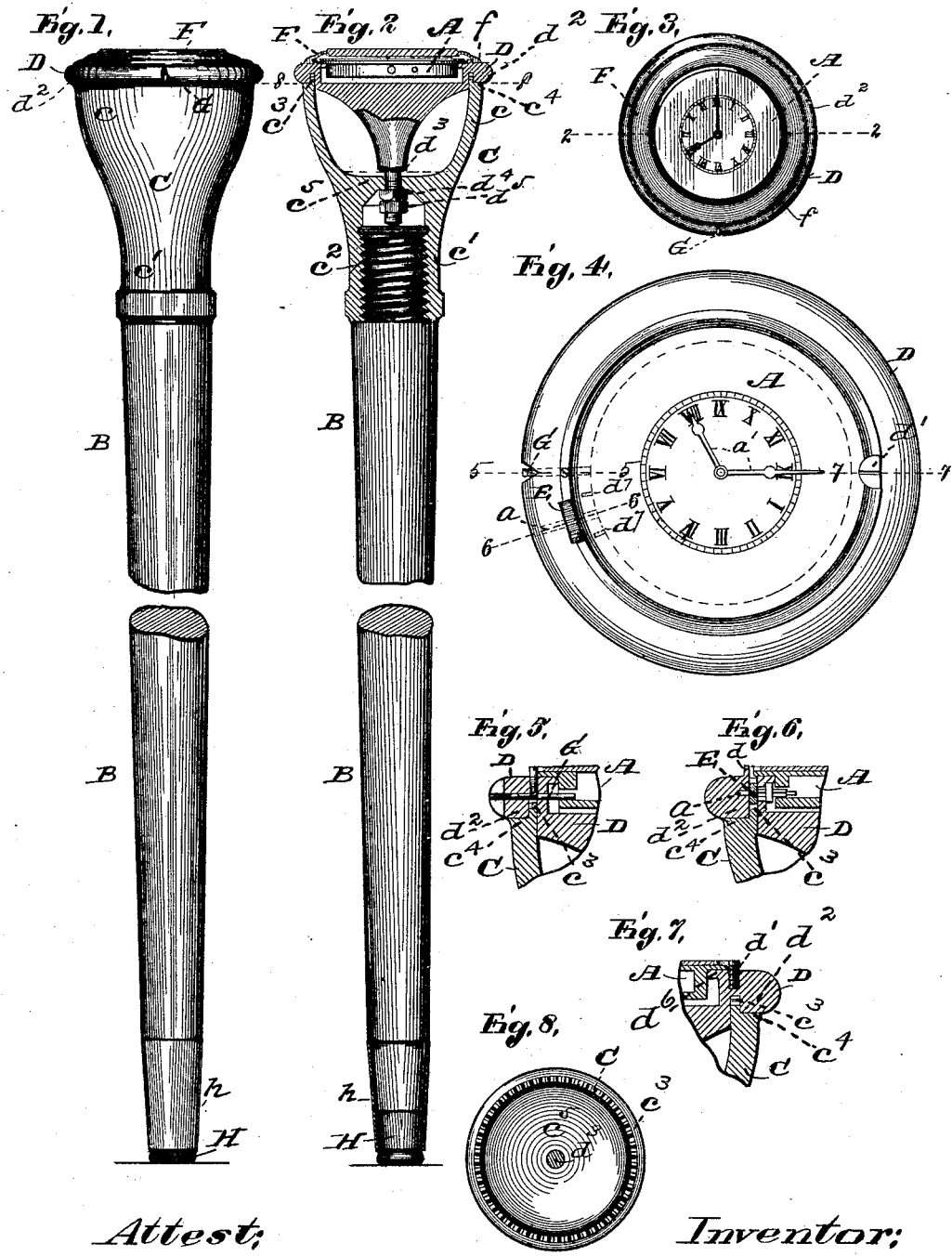

JAMES W. ALLEN, OF ST. LOUIS, MISSOURI.

CANE OR PARASOL WATCH.

SPECIFICATION forming part of Letters Patent No. 409,267, dated August 20, 1889.

Application filed August 20, 1888. Serial No. 283,239. (No model.)

*To all whom it may concern:*

Be it known that I, JAMES W. ALLEN, of St. Louis, Missouri, have made a new and useful Improvement in Cane or Parasol Watches, of which the following is a full, clear, and exact description.

The structure completed has the appearance of a cane or of a parasol-stick, and the watch-movement and the bezel, cap, or case used to inclose or cover the movement forms the top or tip of the structure.

The improvement consists, mainly, in combining the watch-movement with the stick of the cane, parasol, or analogous article in such a manner as thereby to utilize the stick not only as a watch-movement holder, but also as a means for effecting the winding of the watch, substantially as is hereinafter set forth and claimed, aided by the annexed drawings, making part of this specification, and exhibiting the most desirable mode of carrying out the improvement, and in which—

Figure 1 is a side elevation of a cane having the improvement. Fig. 2 is a view, partly sectional and partly in elevation, of the same, the section at the upper end of the cane being on the line 2 2 of Fig. 3. The watch-movement is in edge elevation, and the ferrule at the lower end of the cane is in section. Fig. 3 is a plan of the structure. Fig. 4 is a plan with the bezel removed. Fig. 5 is a vertical section on the line 5 5 of Fig. 4. Fig. 6 is a vertical section on the line 6 6 of Fig. 4. Fig. 7 is a vertical section on the line 7 7 of Fig. 4; and Fig. 8 is a plan of the cup, which with the watch-movement and parts immediately therewith connected forms the upper end of the cane. The holder-stem is shown in section.

The views of the drawings are upon various scales, and the same letters of reference denote the same parts.

The watch-movement A, Figs. 2, 3, 4, 5, 6, and 7, and the stick B, saving as they are modified by the improvement in question, are of the customary forms, respectively.

C represents a part attached to the stick B. Its upper portion $c$ is preferably cup-shaped, as shown, and that part will hereinafter be styled the "cup." Its lower portion $c'$ is in the form of a socket to receive the upper end of the stick. The socket is threaded at $c^2$ to enable the cup to be screwed onto the stick, substantially as is shown in Fig. 2. When the cup and stick are thus united, they can be rotated upon the longitudinal axis of the stick as a single piece. The watch-movement A is held in and attached to a circular holder D, which in turn rests upon the cup. The watch-movement A has the usual stem $a$, wherewith it is wound. The stem has fastened to it a pinion E, Figs. 4 and 6.

The cup C at its top is provided with or is shaped to form what is substantially a crown-wheel $c^3$, Figs. 2, 5, 6, 7, and 8. The pinion E engages with the crown-wheel $c^3$. By holding the holder D stationary and rotating the stick and cup the stem $a$ is rotated and the watch-movement wound up. The watch-movement is inclosed at the top by means of a suitable bezel F, which is secured in position in any suitable manner, as by allowing the flange $f$ of the bezel to fit onto the flange $d$, Fig. 6, of the holder D.

The watch-movement A is secured in the holder D so that the movement and holder are held as a single part in the cup C. The preferable mode of uniting the movement and the holder is by means of the lugs $d^7 d^7$, broken lines Fig. 4, and the screw $d'$, Figs. 4 and 7. The lugs are attached to the watch-movement and pass under the flange $d^6$ of the holder D, and the screw $d'$ is screwed into the holder D and its head projects over the watch-movement. A portion of the screw-head is removed to enable the bezel to be attached, as described. By turning the screw half around its head clears the watch-movement, leaving the last-named part free to be withdrawn from the holder.

The holder D is constructed to receive the projecting stem $a$ and pinion E, Fig. 6, and it is provided with a flange $d^2$, which incloses the crown-wheel $c^3$, and at its lower edge bears upon the shoulder $c^4$ of the cup, substantially as shown in Figs. 5, 6, and 7. The holder is extended downward to form a stem $d^3$, Fig. 2. The stem passes downward through and is journaled in a partition $c^5$ of the cup C, and beneath the partition the stem is threaded to receive the nut $d^4$ and the jam-nut $d^5$, by which means the holder D, together with all the parts above the holder D, is fastened to the cup, so that it cannot be detached there-from, but so that the cup and the holder can be turned upon each other—that is, when the stick and cup rotate to wind the watch-movement, as described, the upper edge of the cup slides beneath the holder-flange $d^2$ and the partition $c^5$ turns upon the stem $d^3$.

A prominent feature of the construction is, contriving the parts so that no opening shall occur through which dirt may penetrate the watch-movement. It will be noticed that there is no such opening, unless possibly around the post-pin G, Figs. 4 and 5, used setting the hands $a'$ of the watch-movement. This push-pin projects through the rim of the holder D, as shown, and it is operated as in ordinary watches.

To prevent any undue shock from being transmitted to the watch-movement in using the device as a cane, the cane is provided with a cushion H, preferably in the form of a rubber plug inserted in the ferrule $h$, Fig. 2. So far as cushioning the watch-movement is concerned, it is immaterial in what manner the watch-movement is attached to the upper end of the stick, whether directly or indirectly, or what sort of cushion is employed, provided the structure is suited to the purposes of a cane or parasol watch.

I claim—

1. The combination of the watch-movement, the stick, the cup, the holder, the pinion, the bezel, and the push-pin, said cup having the crown-wheel, partition, and socket, and said holder inclosing the watch-movement and having the stem journaled in and held beneath said partition, substantially as described.

2. The combination of the watch-movement, the pinion, the cup having the crown-wheel and the partition, and the holder having the stem, said stem being held longitudinally in said partition, substantially as described.

3. The combination of the watch-movement, the pinion, the cup having the crown-wheel, and the holder having the stem, said watch-movement being secured to said holder, and said holder-stem being held longitudinally in said cup, substantially as described.

4. The combination of the watch-movement, the stick, the cup, the holder, and the pinion, said watch-movement being attached to said holder, said cup having the crown-wheel and socket, and said holder at its rim turning upon the upper end of the cup and having a stem which is held longitudinally in the cup, substantially as described.

5. The combination of the watch-movement, the holder, and the cup, said watch-movement being held in said holder, and said holder turning upon the upper end of the cup, inclosing said watch-movement beneath and having a stem held longitudinally within said cup, substantially as described.

6. The combination of the watch-movement, the holder, and the cup, said holder inclosing said watch-movement beneath, and said cup sustaining said holder and inclosing it beneath, substantially as described.

7. The combination of the cup having the partition and socket, the holder having the stem passing through said partition and confined beneath it, and the stick detachably held in said socket, substantially as described.

8. The combination of the stick, the watch-movement, and the cushion, said watch-movement being connected with the upper end of said stick, and the cushion being applied to the lower end of said stick, substantially as described.

9. The combination, in a cane or parasol watch, of the watch-movement, the watch-movement holder, and the cane or parasol stick, said cane or stick at its end being attached to a part which is journaled in said watch-movement holder and in engagement with the watch-winding mechanism for the purpose of effecting the winding of the watch-movement.

Witness my hand.

JAMES W. ALLEN.

Witnesses:
LOUIS D. PICOT,
THEODOR BRUNGENS.